April 13, 1943.  E. A. BOELTER  2,316,663
VEGETABLE THINNER AND BLOCKER
Filed June 16, 1942  2 Sheets-Sheet 1
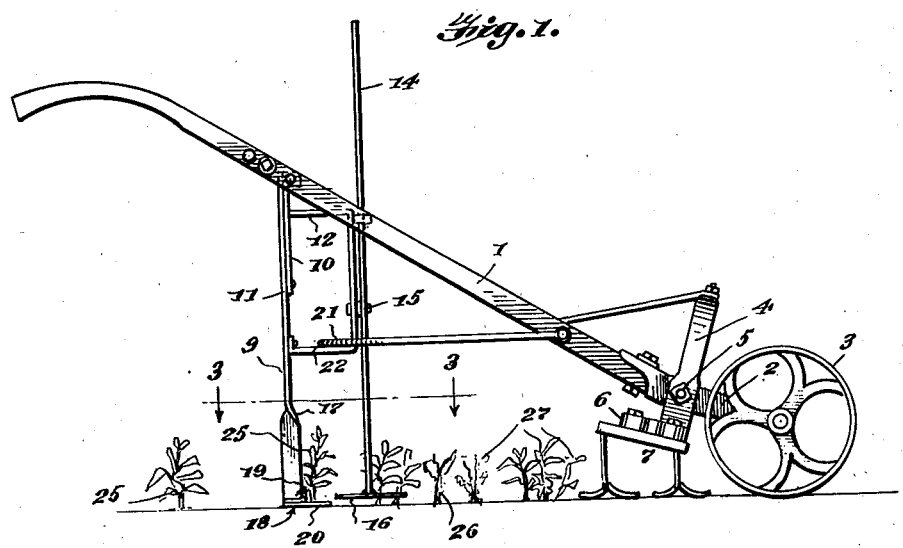
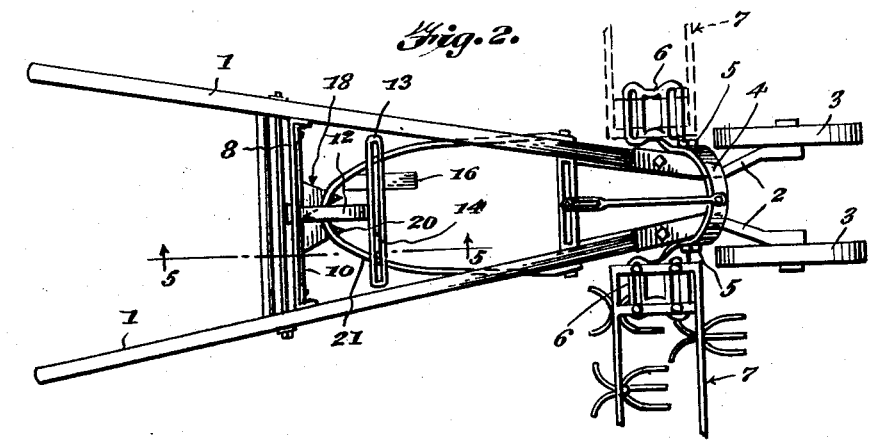
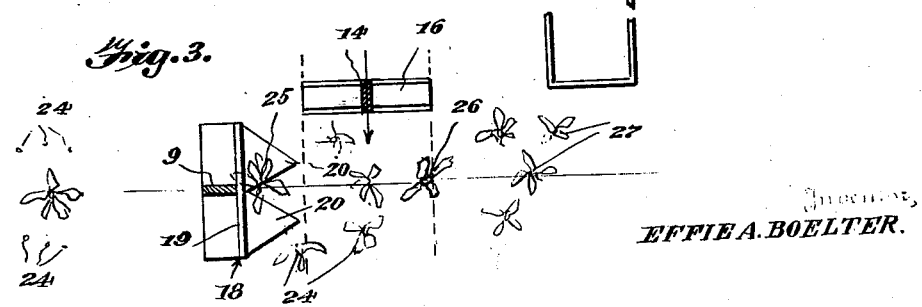
EFFIE A. BOELTER.

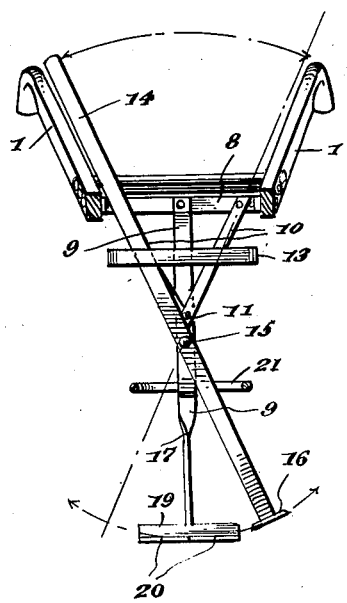
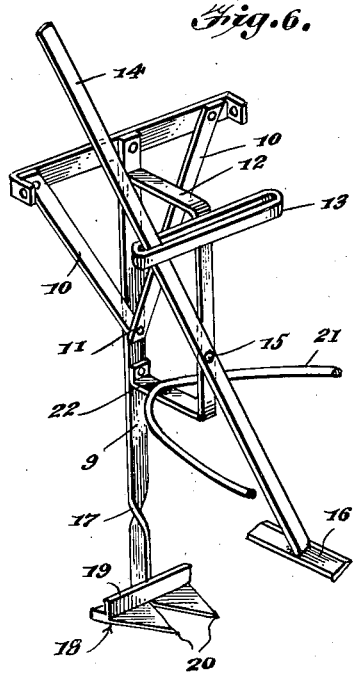
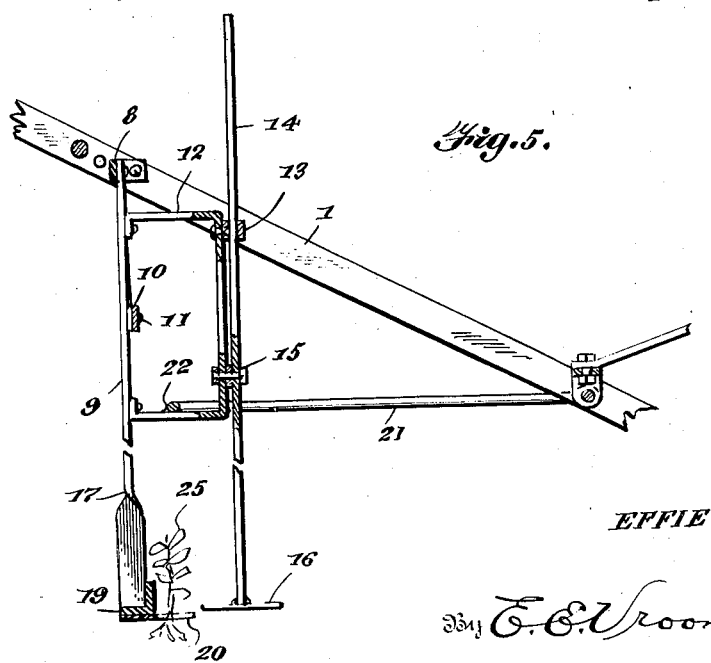

Patented Apr. 13, 1943

2,316,663

UNITED STATES PATENT OFFICE 2,316,663

VEGETABLE THINNER AND BLOCKER

Effie A. Boelter, Sunnyside, Wash.

Application June 16, 1942, Serial No. 447,265

8 Claims. (Cl. 97—59)

This invention relates to a vegetable thinner and blocker.

An object of the invention is the construction of a novel and efficient mechanism attached to a manually-operated wheeled cultivator, whereby rows of vegetables such as beets can be quickly and effieciently thinned and blocked, as well as cultivated synchronously.

Another object of the invention is the construction of a mechanism that can be easily attached to the handles of a cultivator and as the cultivator is passed along over the row of vegetables the operator can easily manipulate the mechanism, whereby the row is blocked, thinned, and cultivated during the travel of the cultivator.

A further object of the invention is the construction of a durable and efficient thinning and blocking mechanism at a minimum cost, and said mechanism attached in a simple manner to the handles of a wheeled cultivator.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a mechanism constructed in accordance with the present invention.

Figure 2 is a top plan view of the same.

Figure 3 is a sectional view taken on line 3—3, Figure 1, and looking in the direction of the arrows.

Figure 4 is a transverse sectional view of the mechanism looking toward the rear thereof.

Figure 5 is a sectional view taken on line 5—5, Figure 2, and looking in the direction of the arrows.

Figure 6 is a perspective view of the thinning and blocking mechanism shown removed from the handles of the cultivator.

In the drawings, in which I have shown the preferred embodiment of my invention, 1 designates the handles of the wheeled cultivator. Metal castings 2 are secured to the lower end of handles 1 and suitably mounted on castings 2 are wheels 3. A yoke frame 4 is secured at 5 to castings 2, and frame 4 is provided with laterally extending slotted brackets 6 to which cultivator devices 7 are suitably attached. As the cultivator is pushed down the row that is being thinned and blocked, both sides of the row are cultivated at the same time by devices 7.

The improved mechanism comprises a horizontal primary brace 8 (Fig. 6) which is fixedly secured by any suitable means at its ends to the inner faces of handles 1. A vertical standard 9 is fixedly secured at its upper end to the center of brace 8. Inclined braces 10 are secured at their upper ends to horizontal brace 8, near the ends of said brace, and their lower ends are brought together at 11 and fixedly secured to the standard 9 near its middle. A vertical substantially U-shaped bracket 12 has its ends fixedly secured to the inner face of the standard 9. A horizontal slotted guide 13 is secured near its center fixedly to the upper end of the vertical portion of the U-shape bracket 12. A blocking handle 14 extends through slotted guide 13 and is pivotally mounted by bolt or rivet 15 upon the front of U-shape bracket 12. A blocking blade 16 is fixedly secured to the lower end of handle 14. The handle 14 is of sufficient length to allow it to extend above handles 1, whereby the operator can easily grasp handle 14 and swing the same upon its pivot 15.

The standard 9 is twisted at 17, so that the lower end of the standard is at right angles to the upper portion, whereby the standard is strengthened against bending. The lower end of standard 9 is fixedly secured to the thinning foot 18. The thinning foot comprises an angle brace 19 which engages the extreme end and one edge of the standard 9 (Fig. 5). Two V-shaped teeth 20 are secured to the bottom of angle brace 19 and each tooth 20 has sharp cutting edges.

An auxiliary horizontal brace 21 is secured at 22 to the horizontal flat portion of U-shaped bracket 12, and the ends of brace 21 are fastened at 23 to the sides of handles 1, whereby the U-shaped bracket 12 is efficiently braced upon the mechanism.

The operation of the mechanism is as follows:

The cultivator is placed in a straddling position on a row of vegetables, such as beets. Then the operator pushes forward on handles 1 which will cause the teeth 20 to cut such plants as 24 (Fig. 3), permitting a beet 25 in the row to ride or be placed between the cutting teeth 20, then handle 14 is grasped and swung to cause the blocking blade to swing entirely across the row which will result in cutting all beets in front of the notch between the teeth, leaving plant 25 uninjured. Then the operator lifts up on handles 1 to cause the thinning foot to clear beet 25 and then drops the thinning foot down in front of beet 25, pushing the machine along until it comes to beet 26, which beet is positioned between the teeth 20, then the handle 14 is again swung to cut or destroy the beets 27. Of course, as the thinning foot 13 is pushed along the row, up to the beet in the row that is to be saved, such beets as are outside of the row that come in contact with the cutting edges of the teeth 20 will be destroyed, as indicated by the dots at the left hand end of Figure 3. Therefore, it will be seen that the row is thinned by the thinning foot 18, blocked by the blocking blade 16, and cultivated by the units 7.

While I have described the preferred embodiment of my invention and illustrated the same in the accompanying drawings, certain minor changes or alterations may appear to one skilled in the art to which this invention relates during the extensive manufacture of the same and I, therefore, reserve the right to make such changes or alterations as shall fairly fall within the scope of the appended claims.

What I claim is:

1. In an apparatus of the class described, the combination with handles, wheels and means mounting said wheels upon the lower ends of said handles, of a thinning unit secured directly to said handles, guiding means mounted on said thinning unit, and blocking means mounted on said thining unit and having a portion movably mounted within said guiding means.

2. In an apparatus of the class described, the combination with handles, wheels and means mounting said wheels upon the lower ends of said handles, of a thinning unit including flat cutting teeth secured directly to said handles, and blocking means movably mounted entirely upon said thinning unit.

3. In an apparatus of the class described, the combination with handles, wheels and means mounting said wheels upon the lower ends of said handles, of a thinning unit comprising contacting teeth, and blocking means supported entirely upon said thinning unit and being adapted to cut vegetable plants in front of said teeth.

4. In an apparatus of the class described, the combination with handles, wheels and means mounting said wheels upon the lower ends of said handles, of a brace secured to said handles, a standard secured to said brace, a thinning foot secured to said standard, a bracket secured to said standard, and blocking means movably mounted on said bracket.

5. In an apparatus of the class described, the combination with handles, wheels and means mounting said wheels upon the lower ends of said handles, of a horizontal brace secured at its ends to said handle, a vertical standard secured at its upper end to said brace, said standard twisted near its lower end whereby the lower end is at right angles to the upper portion of said standard, a thinning foot including an angle brace and a pair of horizontal V-shaped teeth, said angle brace fixedly secured against the lower end and one edge of said standard, blocking means, and means movably mounting said blocking means upon said standard.

6. In an apparatus of the class described, the combination with handles, wheels and means mounting said wheels upon the lower ends of said handles, of a brace secured to said handles, a standard provided with a thinning foot secured to said brace, an outwardly-extending bracket secured to said standard, a horizontal slotted guide secured to said bracket, a blocking handle in said slotted guide and pivotally mounted on said bracket, and a blocking blade secured to the lower end of said handle.

7. In an apparatus of the class described, the combination with handles, wheels and means mounting said wheels upon the lower ends of said handles, of a standard, and means securing said standard upon said handles, a substantially U-shaped bracket secured at its ends to said standard, said standard provided on its lower end with a thinning foot, a horizontal slotted guide secured at its center to the outer portion of said substantially U-shaped bracket, a handle pivotally mounted on said U-shaped bracket near its lower end, said handle extending through said slotted guide, a blocking blade secured to the lower end of said last-mentioned handle, and an auxiliary horizontal brace having a portion fastened to the inner face of said U-shape bracket and also having its ends fastened to the first-mentioned handles.

8. In an apparatus of the class described, the combination with handles, wheels and means mounting said wheels upon the lower ends of said handles, of a standard provided with a horizontal thinning foot on the lower end of said standard, means securing said standard to said handles, said thinning foot being adapted to receive a single vegetable plant in its middle, and a blocking unit pivotally mounted upon said standard and being adapted to swing in an arc in front of said thinning foot.

EFFIE A. BOELTER.